US010284118B2

(12) United States Patent
Henderson et al.

(10) Patent No.: US 10,284,118 B2
(45) Date of Patent: May 7, 2019

(54) TWO-AXIS ANGULAR POINTING DEVICE AND METHODS OF USE THEREOF

(71) Applicant: New Scale Technologies, Inc., Victor, NY (US)

(72) Inventors: David A. Henderson, Farmington, NY (US); Qin Xu, West Henrietta, NY (US)

(73) Assignee: New Scale Technologies, Inc., Victor, NY (US)

( * ) Notice: Subject to any disclaimer, the term of this patent is extended or adjusted under 35 U.S.C. 154(b) by 589 days.

(21) Appl. No.: 15/017,196

(22) Filed: Feb. 5, 2016

(65) Prior Publication Data
US 2016/0233793 A1 Aug. 11, 2016

Related U.S. Application Data

(60) Provisional application No. 62/112,817, filed on Feb. 6, 2015.

(51) Int. Cl.
| | |
|---|---|
| H01L 41/09 | (2006.01) |
| H02N 2/04 | (2006.01) |
| H02N 2/06 | (2006.01) |
| H02N 2/14 | (2006.01) |
| G02B 26/08 | (2006.01) |
| H04N 5/225 | (2006.01) |
| G02B 26/10 | (2006.01) |
| H02N 2/10 | (2006.01) |

(52) U.S. Cl.
CPC ........... *H02N 2/14* (2013.01); *G02B 26/0816* (2013.01); *G02B 26/105* (2013.01); *H02N 2/103* (2013.01); *H02N 2/108* (2013.01); *H04N 5/2251* (2013.01)

(58) Field of Classification Search
CPC ........ H02N 2/14; H02N 2/004; H02N 2/0075; H02N 2/103; H02N 2/108; H02N 2/04; B25J 9/12; H01L 41/042; H01L 41/09; G02B 26/0816; G02B 26/105; H04N 5/2251
USPC ...................... 310/316.01, 316.02, 317, 328; 319/316.02, 317, 328
See application file for complete search history.

(56) References Cited

U.S. PATENT DOCUMENTS 4,175,832 A * 11/1979 Umeki ................. G02B 7/1821
359/225.1
4,888,878 A * 12/1989 Nagasawa ................ B23Q 1/36
318/646

(Continued)

*Primary Examiner* — Thomas M Dougherty
(74) *Attorney, Agent, or Firm* — Pepper Hamilton LLP

(57) ABSTRACT

A two-axis angular pointing device includes a pivot bearing configured to support a payload. A first actuator is positioned to contact the payload at a first drive point. A second actuator is positioned to contact the payload at a second drive point. The first actuator is configured to generate a first movement of the payload in a direction substantially orthogonal to a plane defined by a center of the pivot bearing, the first drive point, and the second drive point to cause the payload to rotate around a first rotation axis. The second actuator is configured to generate a second movement of the payload at the second drive point in the direction substantially orthogonal to the plane to cause the payload to rotate around a second rotation axis. A method of making a two-axis angular pointing device is also disclosed.

18 Claims, 8 Drawing Sheets

(56) References Cited

U.S. PATENT DOCUMENTS

| | | | | |
|---|---|---|---|---|
| 4,928,030 | A * | 5/1990 | Culp | H01L 41/0825 |
| | | | | 310/317 |
| 5,245,464 | A * | 9/1993 | Jensen | G02B 7/1821 |
| | | | | 359/223.1 |
| 5,252,870 | A * | 10/1993 | Jacobsen | F04C 15/0057 |
| | | | | 310/82 |
| 5,529,277 | A * | 6/1996 | Ostaszewski | F16C 11/12 |
| | | | | 248/398 |
| 5,747,915 | A * | 5/1998 | Benavides | H02N 2/105 |
| | | | | 310/306 |
| 6,198,180 | B1 * | 3/2001 | Garcia | B81B 3/0062 |
| | | | | 310/36 |
| 7,309,943 | B2 | 12/2007 | Henderson et al. | |
| 7,786,648 | B2 | 8/2010 | Xu et al. | |
| 8,299,733 | B2 | 10/2012 | Sattler et al. | |
| 8,304,960 | B2 | 11/2012 | Sattler et al. | |
| 8,450,905 | B2 | 5/2013 | Guidarelli et al. | |
| 8,466,637 | B2 | 6/2013 | Guidarelli et al. | |
| 8,693,076 | B2 * | 4/2014 | Mizoguchi | B41J 2/473 |
| | | | | 359/224.1 |
| 8,698,374 | B2 | 4/2014 | Xu et al. | |
| 9,134,187 | B1 * | 9/2015 | Organ | G05G 9/047 |
| 2008/0310001 | A1 * | 12/2008 | Bernstein | G02B 26/0833 |
| | | | | 359/198.1 |

* cited by examiner

TWO-AXIS ANGULAR POINTING DEVICE AND METHODS OF USE THEREOF

This application claims benefit of U.S. Provisional Patent Application Ser. No. 62/112,817, filed on Feb. 6, 2015, which is hereby incorporated by reference in its entirety.

FIELD

This technology relates to a highly miniaturized two-axis angular positioning system that rotates a payload, such as reflective mirrors, transmissive lenses, optical filters or gratings, photonics devices, or image capture systems, to achieve a desired pointing direction.

BACKGROUND

Miniature two-axis pointing systems are useful for many applications, such as video rate imaging and display, scanning dermatology lasers to achieve precise exposure levels, scanning laser sources in fluorescence microscopes and imaging instruments, moving laser beams in in-vivo and in-vitro micro laser surgery, pointing laser beams for range finding (LIDAR), 3D measurement, spectroscopy, remote sensing of atmospheric conditions, pollution sources, or explosives, stabilization of motion to correct for hand tremors, laser marking, engraving or machining, laser beam steering, tracking for free-space optical communication systems, variable optical attenuation, fiber-to-fiber optical switching, pointing and jitter compensation of targeting lasers, and automated obstacle detection for tracking and avoidance for robots, vehicles, or UAV's, by way of example.

For larger pointing systems, with payloads much bigger than 20 mm diameter, nested gimbal mechanisms or two-mirror galvanometer driven devices have been employed. These types of pointing systems are difficult to miniaturize. For pointing systems with payloads much smaller than 10 mm diameter, MEMS (micro electro mechanical systems) devices have been utilized. MEMS devices use silicon micro machining and other semiconductor manufacturing processes and are generally limited by small diameter mirrors fabricated from a limited number of materials, the need for more than 100 volts to actuate the mirror, limited angular range, slower dynamic response for mirrors larger than a few millimeters, and the lack of commercially integrated drive and control electronics.

SUMMARY

A two-axis angular pointing device includes a pivot bearing configured to support a payload. A first actuator is positioned to contact the payload at a first drive point. A second actuator is positioned to contact the payload at a second drive point. The first actuator is configured to generate a first movement of the payload in a direction substantially orthogonal to a plane defined by a center of the pivot bearing, the first drive point, and the second drive point to cause the payload to rotate around a first rotation axis. The second actuator is configured to generate a second movement of the payload at the second drive point in the direction substantially orthogonal to the plane to cause the payload to rotate around a second rotation axis.

A method for making a two-axis angular pointing device includes providing a pivot bearing configured to support a payload. A first actuator is positioned to contact the payload at a first drive point. A second actuator is positioned to contact the payload at a second drive point. The first actuator is configured to generate a first movement of the payload in a direction substantially orthogonal to a plane defined by a center of the pivot bearing, the first drive point, and the second drive point to cause the payload to rotate around a first rotation axis. The second actuator is configured to generate a second movement of the payload at the second drive point in the direction substantially orthogonal to the plane to cause the payload to rotate around a second rotation axis.

This exemplary technology provides a number of advantages including provide a more compact and efficient two-axis point device and methods. The present technology is compact, with a large range of motion, capability to move a wide variety of payloads, faster dynamic response, capability to hold any angular position without power, ability to operate directly from typical battery voltages, while integrating the total system in the smallest possible size.

DETAILED DESCRIPTION

Figure 1:
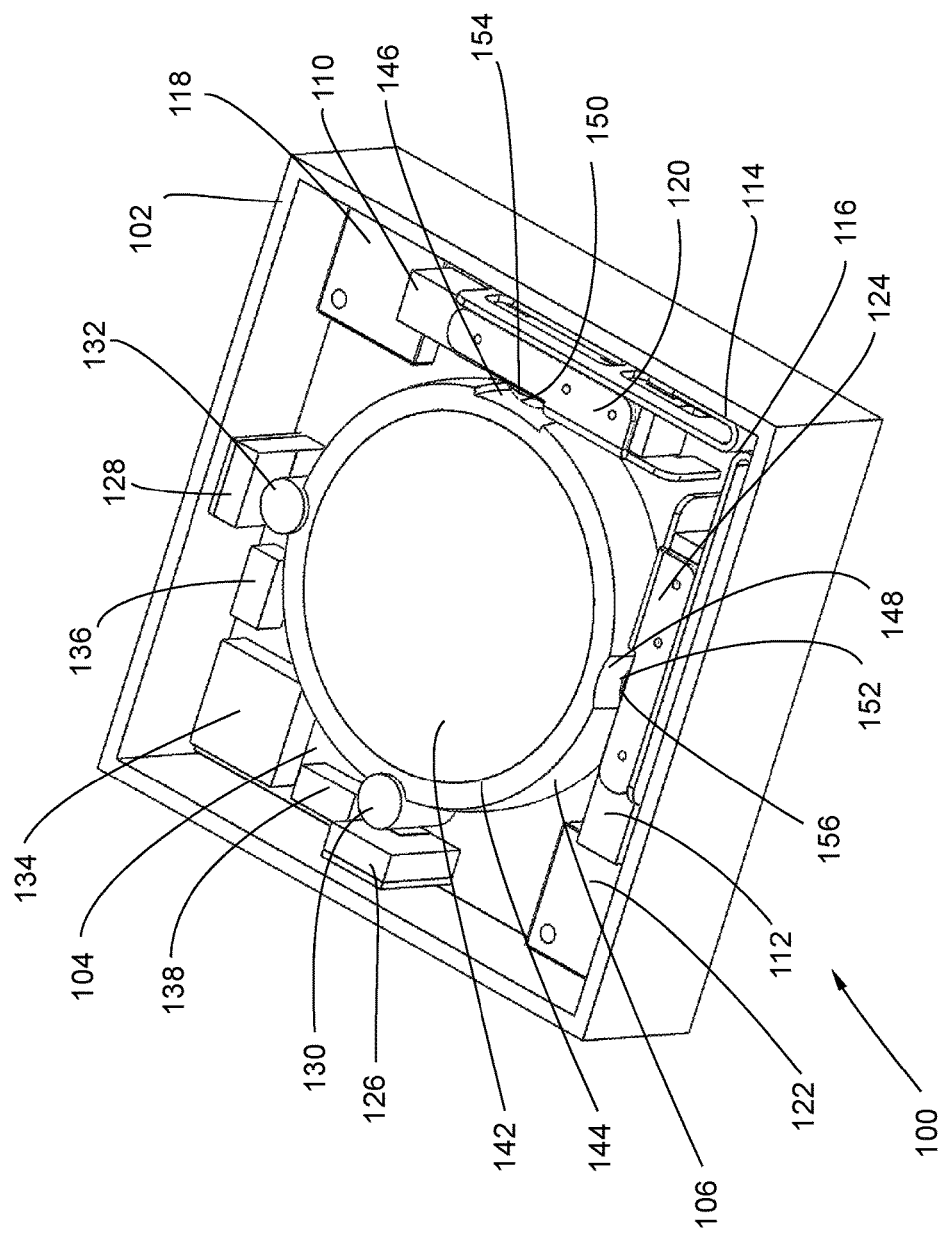
FIG. 1 is a perspective view of an example of a two-axis angular positioning device.

An exemplary two-axis angular pointing device 100 is illustrated in FIGS. 1-5. The exemplary two-axis pointing device 100 includes a housing 102, a circuit board 104, a mirror 106, a pivot bearing 108, a first actuator 110, a second actuator 112, a first spring frame 114, a second spring frame 116, a first driving circuit 118 coupled to a first flexible printed circuit 120, a second driving circuit 122 coupled to a second flexible printed circuit 124, a first sensor 126, a second sensor 128, a first magnet 130, a second magnet 132, a microcontroller 134, and connectors 136 and 138, although the two-axis angular pointing device 100 could include other types and numbers of assemblies, devices, components, and/or other elements in other configurations. This exemplary technology provides a number of advantages including provide a more compact and efficient miniaturized two-axis angular pointing device that rotates a payload to achieve a desired pointing direction.

Figure 2:
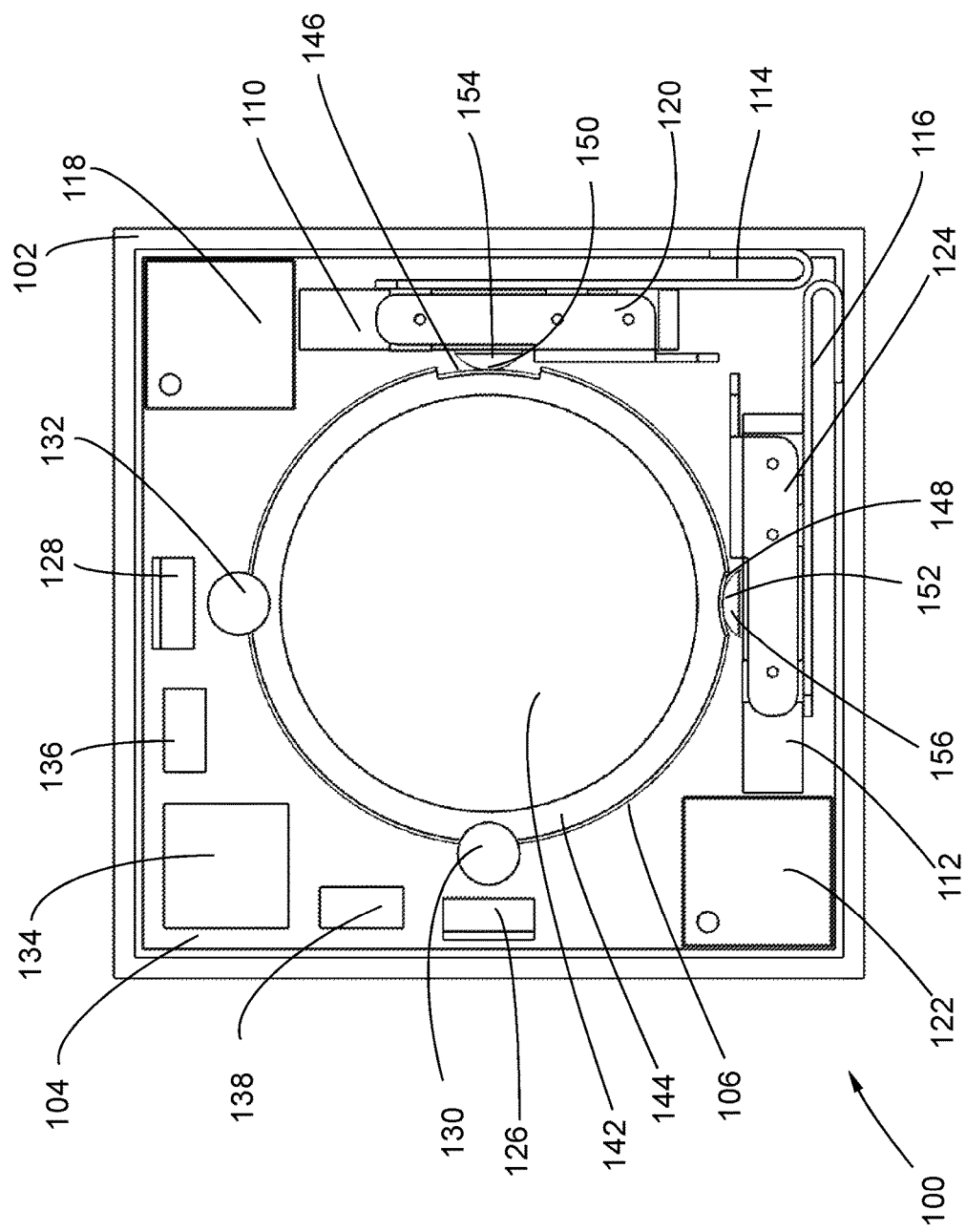
FIG. 2 is a top view of the two-axis angular positioning device as shown in FIG. 1.

Referring more specifically to FIGS. 1 and 2, the housing 102 forms the outer structure of the two-axis angular pointing device 100. The housing 102 is configured to house the operative elements of the two-axis angular pointing device 100 and may have various configurations depending on the elements included therein. The housing 102 is compact with a volume less than one cubic centimeter to provide a highly miniaturized two-axis angular pointing device 100, although the housing 102 may have other sizes and configurations. In this example, housing 102 includes circuit board 104 as a base that supports one or more elements of the two-axis angular pointing device 100 as described herein. The housing 102 is configured to house a payload that may be rotated in two-axes, such as the mirror 106, although the housing may be configured to house other types and numbers payloads, such as transmissive lenses, optical filters, gratings, photonics devices, image capture sensors, or other sensors, or combinations thereof, by way of example only.

Figure 3:
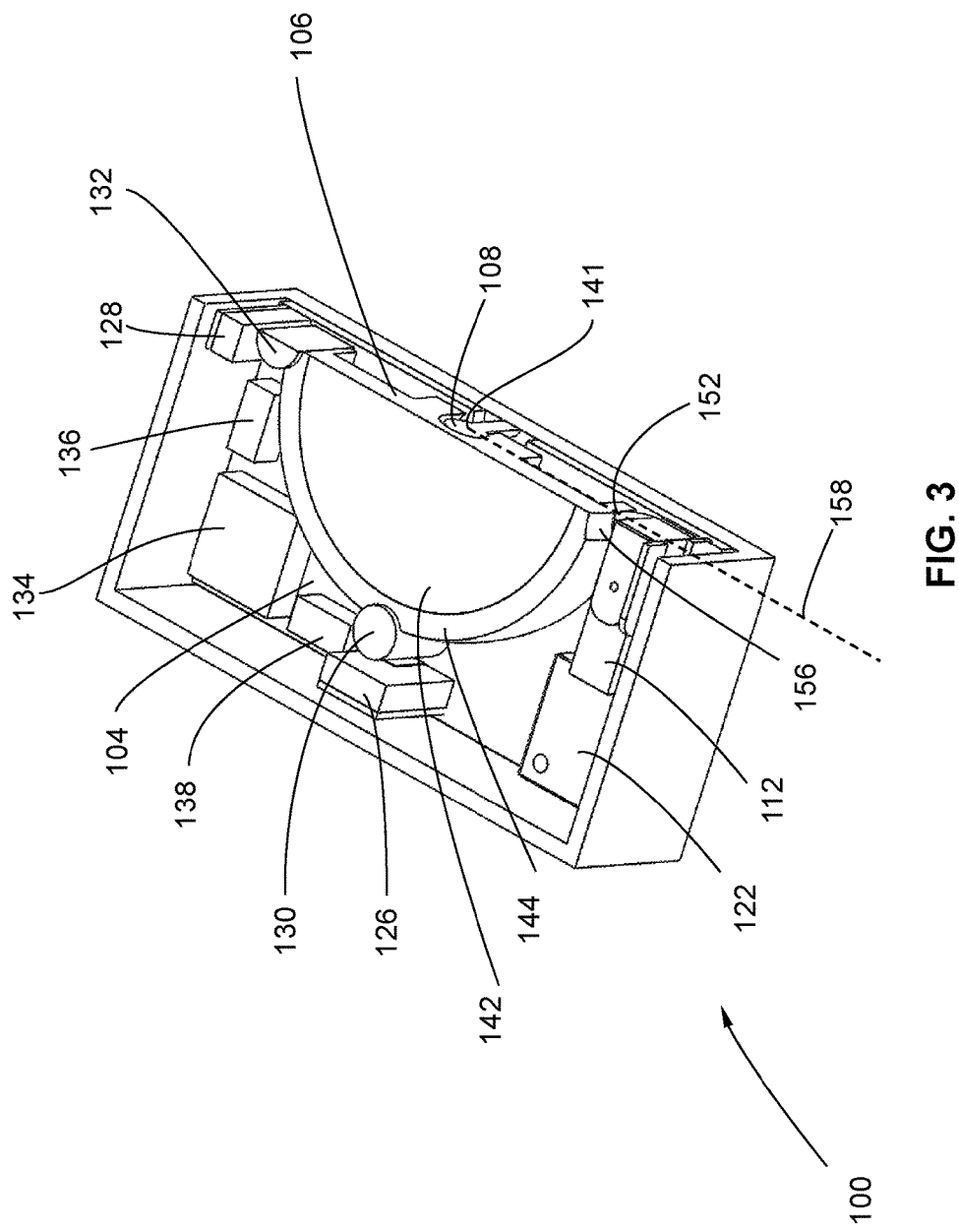
FIG. 3 is a partial perspective view of the two-axis angular positioning device as shown in FIG. 1.
Figure 4:
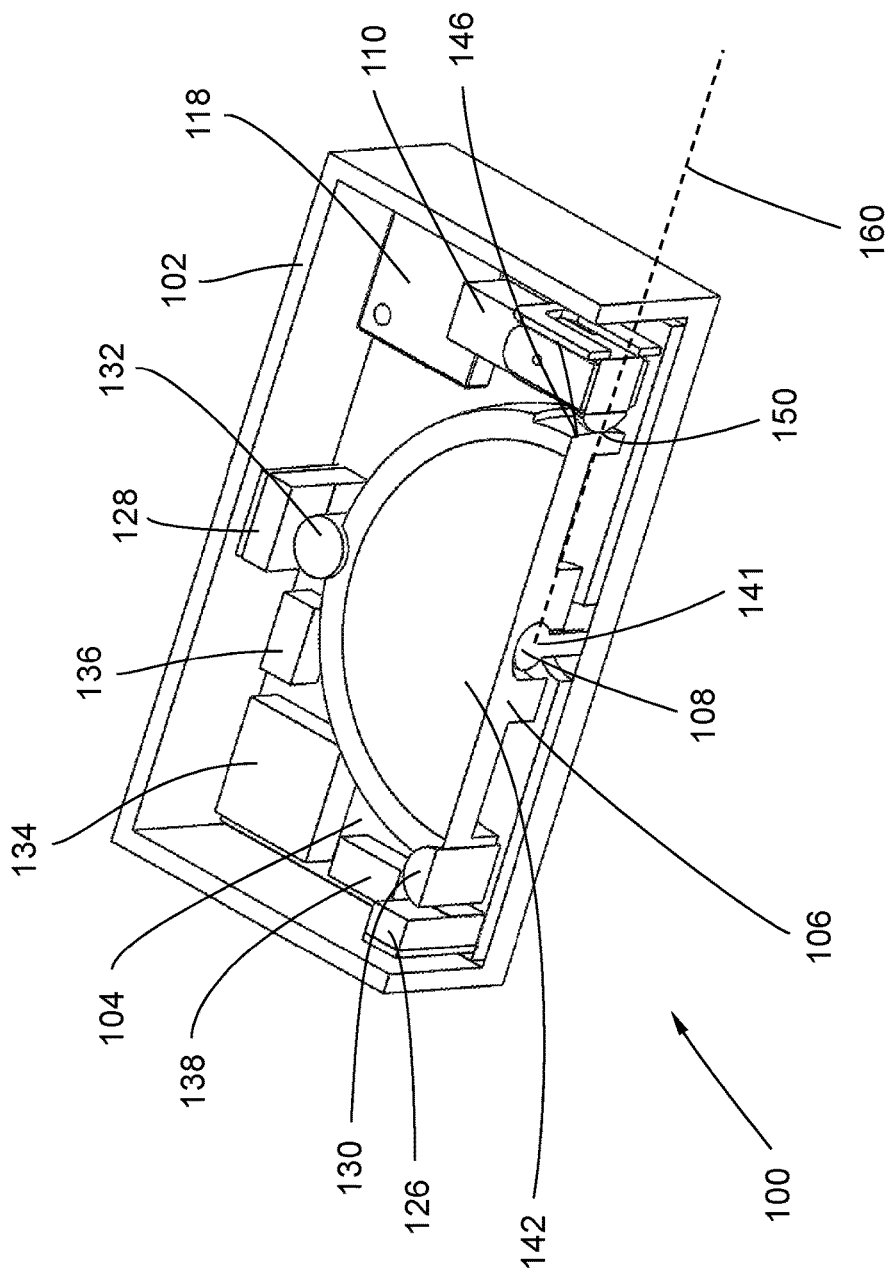
FIG. 4 is another partial perspective view of the two-axis angular positioning device as shown in FIG. 1.
Figure 5:
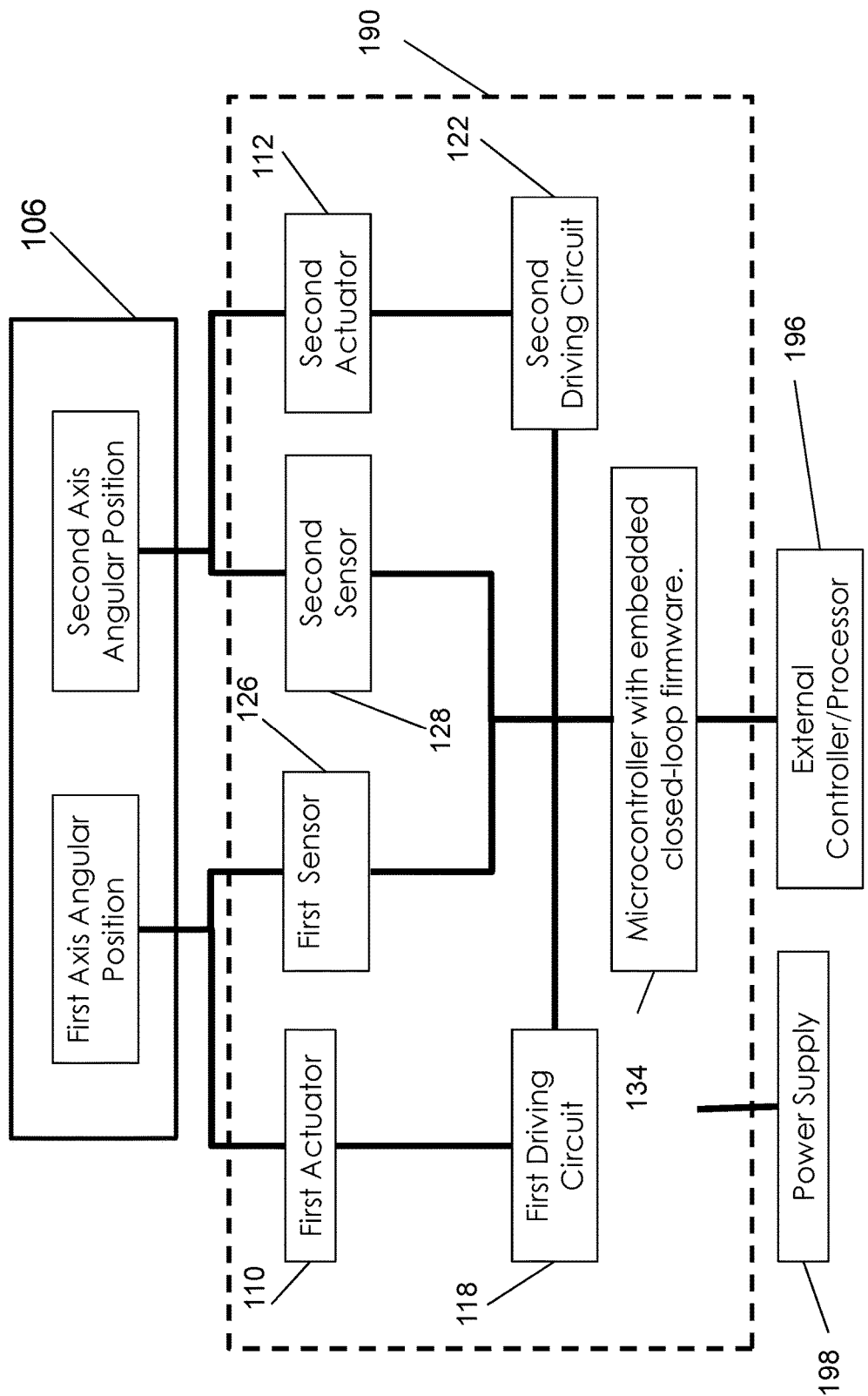
FIG. 5 is a block diagram illustrating an exemplary control system for the two-axis angular positioning device as shown in FIG. 1 coupled to an external controller or processor and a power supply.

In this example, the mirror 106 is supported within the housing 102 by the pivot bearing 108, as illustrated in FIGS. 3 and 4. A pivot bearing center 141, as shown in FIGS. 3 and 4, is located at the center of the mirror 106. The mirror 106 is also frictionally coupled within the housing 102 to the first actuator 110 and the second actuator 112, which provide for movement of the mirror 106 as described below.

In this example, the mirror 106 has a round configuration, although other shapes may be used. The reflective mirror 106 includes a mirror surface 142 surrounded by a non-reflective mirror edge 144, although the mirror could have other configurations with or without an edge. The mirror edge 144 includes one or more surfaces, such as spherical surface 146 and toroidal surface 148, by way of example only, that are configured to interact with the first actuator 110 and the second actuator 112, respectively, to provide the frictional coupling, although other surface shapes in other locations along the mirror edge 144 may be utilized.

Referring now more specifically to FIGS. 3 and 4, the pivot bearing 108 is centrally mounted in the housing 102 to support mirror 106, such that the pivot bearing center 141 is located at the center of the housing 102, although other types and numbers of bearings may be utilized in other locations of the housing 102. The pivot bearing 108 is configured to receive and support the mirror 106, although the pivot bearing 108 may be configured to receive and support other numbers and types of payloads within the housing 102.

The pivot bearing 108 provides rotational freedom of the mirror 106, while constraining linear movement of the mirror 106. In this example, the pivot bearing 108 is located at the center of the mirror 106 and just behind the reflective mirror surface 142. The mirror 106 is centered on the pivot bearing 108, such that the center of curvature of the spherical surface 146 is located at the pivot bearing center 141.

Referring again more specifically to FIGS. 1 and 2, the first actuator 110 and the second actuator 112 are positioned within the housing 102 in frictional contact with the mirror 106 at a first drive point 150 and a second drive point 152, respectively. In this example, the first actuator 110 and the second actuator 112 are piezoelectric ultrasonic motors, such as model number MLP PB04 which is produced by TDK-EPC® (EPCOS Division), which is described in U.S. Pat. No. 7,786,648, the disclosure of which is hereby incorporated by reference herein in its entirety, although other types of vibration motors may be used for the first actuator 110 and the second actuator.

The first actuator 110 includes a first actuator spherical surface 154 that contacts the mirror 106 at the spherical surface 146 to define the first drive point 150, although the first actuator 110 may include other types or numbers of elements in other configurations to interact with the mirror 106. The second actuator includes a second actuator spherical surface 156 that contacts the mirror 106 at the toroidal surface 148 to define the second drive point 152, although the second actuator 112 may include other types or numbers of elements in other configurations to interact with the mirror 106. In this example, the radius of the toroidal surface 148 is slightly larger than the radius of the second actuator spherical surface 156 and the centerline of the toroidal surface 148 is substantially aligned with a line defined by the pivot bearing center 141 and the second drive point 152.

In this exemplary configuration, the pivot bearing center 141, the first drive point 150, and the second drive point 152 define a plane that is substantially parallel to the mirror surface 142 when the mirror 106 is at a midpoint of its range of angular movement on the pivot bearing 108. The mirror 106 is free to rotate in two separate axes. The first rotation axis 158, as shown in FIG. 3, is defined by a line extending between the pivot bearing center 141 and the second drive point 152, while the second rotation axis 160, as shown in FIG. 4, is defined by a line extending between the pivot bearing center 141 and the first drive point 150. The first rotation axis 158 is orthogonal to the second rotation axis 160 to provide two-axes rotation of the mirror 106, by way of example. In one example, the first rotation axis 158 and the second rotation axis 160 provide a range of motion of plus or minus 9 agrees for each axis, although other ranges of motion are contemplated.

The first actuator 110 is coupled to the housing 102 through the first spring frame 114, although other flexible members may be utilized. The first spring frame 114 is coupled to a wall of the housing and is flexible in the direction parallel to the second rotation axis 160, as shown in FIG. 4, and relatively stiffer in the directions orthogonal to the second rotation axis 160. The second actuator 112 is coupled to the housing 102 through the second spring frame 116, although other flexible members may be utilized. The second spring frame 116 is coupled to an outer wall of the housing orthogonal to the first spring frame 114, and is flexible in the direction parallel to the first rotation axis 158 and relatively stiffer in the directions orthogonal to the first rotation axis 158. When the mirror 106 is installed in the housing 102, the first spring frame 114 and the second spring frame 116 are deflected against the outer walls of the housing 102 and generate a normal force and a friction force at the first drive point 150 and the second drive point 152, respectively with equal and opposite reaction forces at the pivot bearing 108.

Referring now more specifically to FIGS. 1, 2, and 4, the first actuator 110 is electrically connected to the first driving circuit 118 through the first flexible printed circuit 120, while the second actuator 112 is electrically connected to the second driving circuit 122 through the second flexible printed circuit 124, although the first actuator 110 and the second actuator 112 may be coupled to other types and numbers of devices in other manners. First driving circuit 118 and second driving circuit 122 are fixedly attached to the circuit board 104 within the housing 102. The first driving circuit 118 and the second driving circuit 122 may be model number NSD2101 produced by AMS® (Unterpremstaetten, Austria), which incorporates the circuits disclosed in U.S. Pat. Nos. 7,786,648, 8,299,733, 8,304,960, 8,450,905, and 8,698,374, the disclosures of which are hereby incorporated herein by reference in their entirety, although other driving circuits may be utilized. The first flexible printed circuit 120 receives and transmits signals from the first driving circuit 118 to the first actuator 110. The second flexible printed circuit 124 receives and transmits signals from the second driving circuit 122 to the second actuator 112. A variety of suitable printed circuit boards are disclosed, by way of example only, in U.S. Pat. No. 7,309,943, the disclosure of which is hereby incorporated herein by reference in its entirety, although other types and numbers of flexible printed circuit boards may be utilized.

Referring again now to FIGS. 1 and 2, the first sensor 126 and second sensor 128 are located within the housing 102 to determine the angular position of the mirror 106 about the first rotation axis 158 and the second rotation axis 160, respectively. By way of example, the first sensor 126 and the second sensor 128 are model number AS5510 which is produced by AMS® (Unterpremstaetten, Austria), although other sensors may be utilized.

The first sensor 126 is located in the housing 102 opposite the first drive point 150, although the first sensor 126 may be located in other locations. In this example, the first sensor 126 is soldered in position on circuit board 104 and is stationary within the housing 102. The first magnet 130 is positioned on mirror edge 144 proximate to the first sensor 126. The first sensor 126 is configured to detect changes in the position of the first magnet 130 to determine changes in the angular position of mirror 106 around the first rotation axis 158, as shown in FIG. 3.

The second sensor 128 is located in the housing 102 opposite the second drive point 152, although the second sensor 128 may be located in other locations. In this example, the second sensor 128 is soldered in position on circuit board 104 and is stationary within the housing 102. The second magnet 132 is positioned on mirror edge 144 proximate to the second sensor 128. The second sensor 128 is configured to detect changes in the position of the second magnet 132 to determine changes in the angular position of mirror 106 around the second rotation axis 160, as shown in FIG. 4.

Referring now more specifically to FIGS. 1 and 4, first driving circuit 118, second driving circuit 122, first sensor 126, and second sensor 128 are all electrically connected to microcontroller 134, although these elements may be electrically coupled to other devices in other locations. By way of example, microcontroller 134 may be model number dsPIC33FJ128MC506-I/PT produced by Microchip®, although other microcontrollers may be utilized. The microcontroller 134 is configured to create a two-axis closed-loop drive and control system with bi-directional communication with the first and second drive circuits 118 and 122 and the first and second sensors 126 and 128, by way of example.

Referring now to FIGS. 1 through 5, the connectors 136 and 138 are installed on circuit board 104 for connection to an external electrical power source 198 and communication with an external controller 196, respectively, although other types and numbers of systems, devices, components, and elements may be coupled together in other configurations. Microcontroller 134 is electrically coupled to connectors 136 and 138 in order to communicate with the external controller 196, although the microcontroller 134 may communicate with other devices in other locations. One example of the external controller 196 is a computer with a USB, SPI, or I2C communications port that can send serial commands and receive serial information from the microcontroller 134.

An example of the operation of the two-axis angular pointing device 100 will now be described with reference to FIGS. 1-5. As shown in FIGS. 1 and 2, the mirror 106 is installed in the housing 102. When the mirror 106 is installed in the housing 102, the first spring frame 114 and the second spring frame 116 are deflected against the outer walls of the housing 102 and generate a normal force and a friction force at the first drive point 150 and the second drive point 152, respectively, although other preloading methods may be utilized. In this exemplary configuration, the pivot bearing center 141, the first drive point 150, and the second drive point 152 define a plane that is substantially parallel to the mirror surface 142. This plane defines the midpoint of the range of angular movement of the mirror 106 on the pivot bearing 108.

Next, the first actuator 110 and the second actuator 112 are energized to generate angular movement of the mirror 106 about the first rotation axis 158 and the second rotation axis 160, as shown in FIGS. 3 and 4, respectively, in order to point the mirror surface 142 of the mirror 106. The first actuator 110 may receive one or more drive signals from the first driving circuit 118 through the first flexible printed circuit 120, while the second actuator 112 may receive one or more drive signals from the second driving circuit 122 through the second flexible printed circuit 124.

When energized by the received drive signals, the first actuator 110 vibrates to generate tangential friction at the mirror edge 144 between the first actuator spherical surface 154 and the spherical surface 146 at the first drive point 150. The generated movement of the mirror 106 at the first drive point 150 is substantially orthogonal to the mirror surface 142. The generated friction causes the mirror 106 to rotate on the pivot bearing 108 around the first rotation axis 158. The rotation of the mirror 106 about the first rotation axis 158 may be in a positive or negative direction with respect to the plane defined by the pivot bearing center 141, the first drive point 150, and the second drive point 152, which is the midpoint of angular motion of the mirror 106 about either axis.

When energized by the received drive signals, the second actuator 112 vibrates to generate tangential friction at the mirror edge 144 between the second actuator spherical surface 156 and the toroidal surface 148 at the second drive point 152. The generated movement of the mirror 106 at the second drive point 152 is substantially orthogonal to the mirror surface 142. The generated friction causes the mirror 106 to rotate on the pivot bearing 108 around the second rotation axis 160. The rotation of the mirror 106 about the second rotation axis 160 may be in a positive or negative direction with respect to the plane defined by the pivot bearing center 141, the first drive point 150, and the second drive point 152, which is the midpoint of angular motion of the mirror 106 about either axis.

As the mirror 106 rotates about either axis of rotation, the first magnet 130 and the second magnet 132, which are coupled to the mirror edge 144, move along with the mirror 106. First sensor 126 and second sensor 128 measure the linear movement of the first magnet 130 and the second magnet 132, respectively, based on the change in magnetic strength detected, although other detection mechanisms may be utilized. The linear movement of the first magnet 130 and second magnet 132 corresponds to the linear movement of the mirror edge, which in turn corresponds to the angular movement of the mirror about the first rotation axis 158 or the second rotation axis 160.

The microcontroller 134 may employ a closed-loop control algorithm, such as described in U.S. Pat. No. 8,466,637, the disclosure of which is hereby incorporated by reference in its entirety, although other numbers and/or types of algorithms or other controls may be utilized. The first driving circuit 118 and the second driving circuit 122 provide drive signals to vibrate the first actuator 110 and the second actuator 112, respectively. The vibrations of the first actuator 110 and second actuator 112 generate tangential forces on the mirror edge 144 that result in rotations around the first rotation axis 158 and the second rotation axis 160. The first sensor 126 and the second sensor 128 measure the angular positions about both axes. The microcontroller 134 then changes the angular positions of the mirror 106 about the first rotation axis 158 or the second rotation axis 160 based on the measured positions in a closed-feedback loop.

Figure 6:
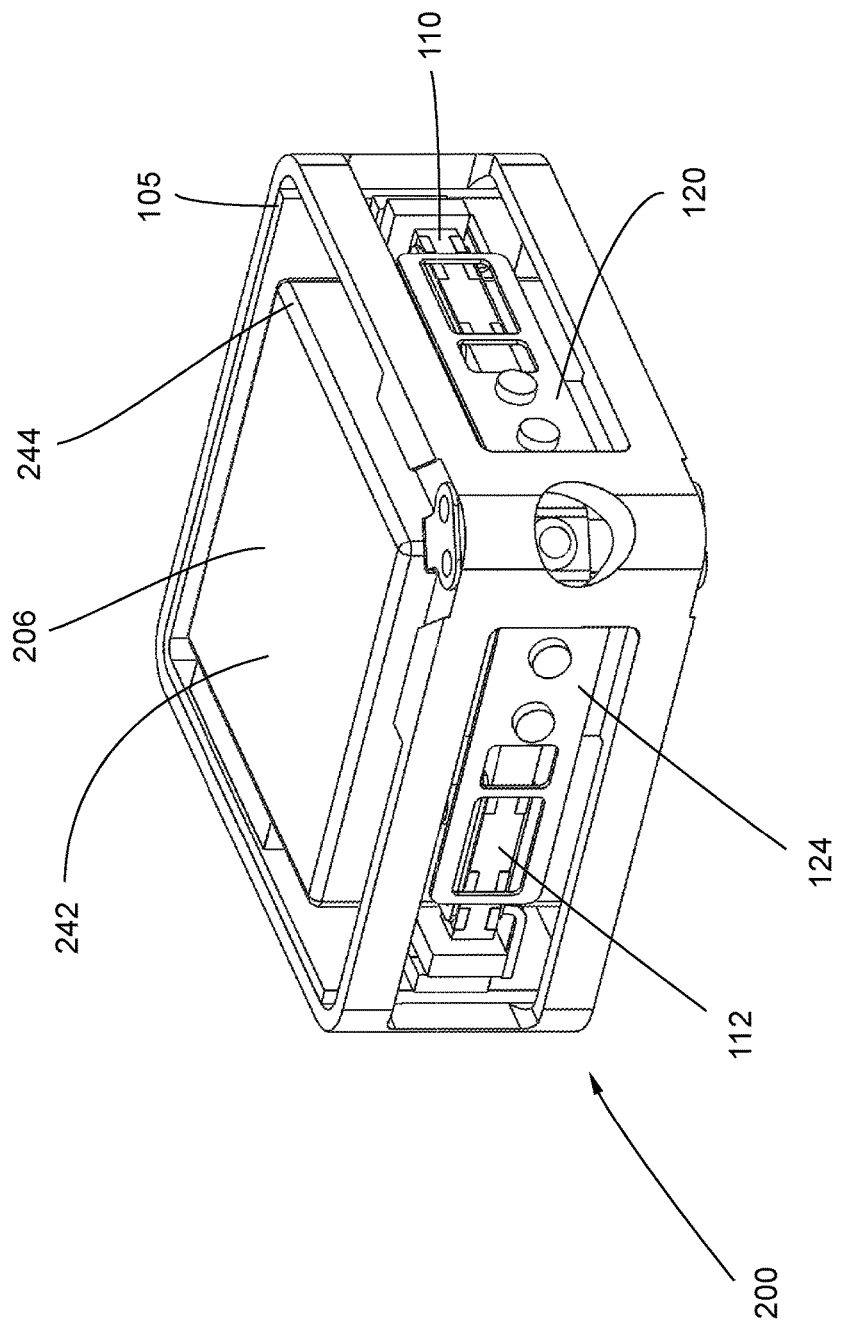
FIG. 6 is a perspective view of another example of a two-axis angular positioning device.
Figure 7:
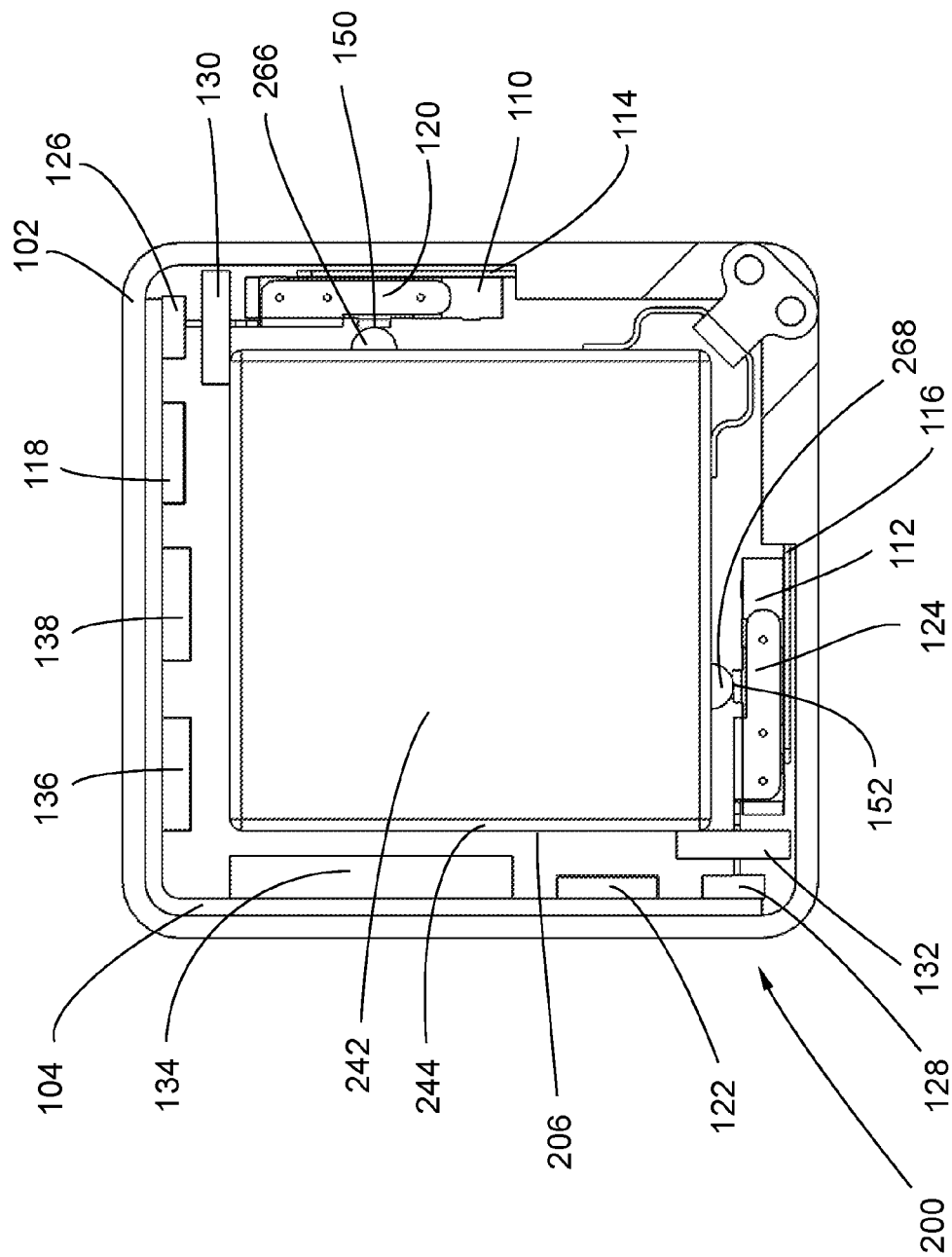
FIG. 7 is a top view of the two-axis angular positioning device as shown in FIG. 6.
Figure 8:
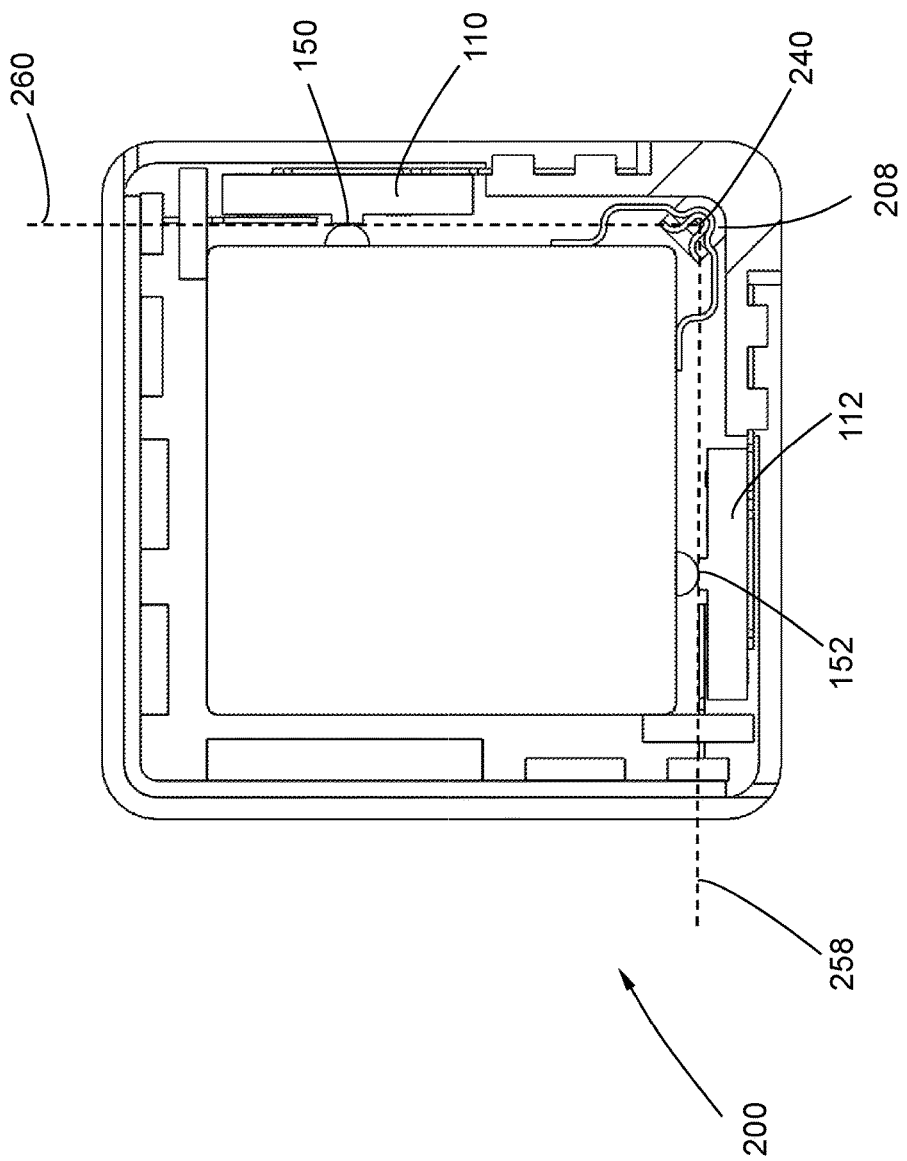
FIG. 8 is a top sectional view of the two-axis angular positioning device as shown in FIG. 6.

Referring now to FIGS. 6-8, another example of a two-axis angular pointing device 200 is shown. Two-axis angular pointing device 200 is the same in structure and operation as two-axis angular pointing device 100, except as illustrated and described herein. Elements in two-axis angular pointing device 200 which are like those in two-axis angular pointing device 100 have like reference numerals.

In this example, the two-axis angular pointing device 200 includes a mirror 206, which is in a square configuration, although other shapes may be utilized. The mirror 206 includes a square mirror surface 242 surrounded by a mirror edge 244. The mirror edge 244 includes protrusions 266 and 268 that extend from the mirror edge to establish the first drive point 150 and a second drive point 152 with the first actuator 110 and the second actuator 112, respectively. The protrusions 266 and 268 have cylindrical surfaces perpendicular to the mirror surface 242. The protrusions 266 and 268 contact the first actuator spherical surface 154 and the second actuator spherical surface 156, respectively, to define the first drive point 150 and the second drive point 152.

In this example, the pivot bearing 208 is located at the corner of the housing 102, as illustrated in FIG. 8, although the pivot bearing 208 may be located in other locations of the housing 102. The pivot bearing 208 supports the mirror 206 at the corner of the mirror 206 just behind the mirror surface 242. As shown in FIG. 8, the first rotation axis 258 is defined by a line extending between the pivot bearing center 240 and the second drive point 152, while the second rotation axis 260, as shown in FIG. 8, is defined by a line extending between the pivot bearing center 240 and the first drive point 150. The first rotation axis 258 is substantially orthogonal to the second rotation axis 260 to provide two-axes rotation of the mirror 206, by way of example. This example allows mirror 206 to provide a clear aperture for optical transmission without interference from the pointing system.

Accordingly, the technology, as illustrated and described with the examples herein, provides more a more compact and flexible two-axis angular pointing system. This technology also advantageously holds the angular position of the without an additional power input.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Accordingly, the technology is limited only by the following claims and equivalents thereto.

What is claimed is:

1. A two-axis angular pointing device comprising:
a pivot bearing configured to support a payload;
a first actuator positioned to contact the payload at a first drive point;
a second actuator positioned to contact the payload at a second drive point, wherein the first actuator is configured to generate a first movement of the payload in a direction substantially orthogonal to a plane defined by a center of the pivot bearing, the first drive point, and the second drive point to cause the payload to rotate around a first rotation axis, and the second actuator is configured to generate a second movement of the payload at the second drive point in the direction substantially orthogonal to the plane to cause the payload to rotate around a second rotation axis;
a first drive circuit coupled to the first actuator and a second drive circuit coupled to the second actuator; and
a control device coupled to the first drive circuit and the second drive circuit, the control device comprising a processor coupled to a memory and configured to execute programmed instructions received from another processor or stored in the memory comprising:
generating and providing one or more driving signals to the first actuator to rotate the payload about the first axis of rotation; and
generating and providing one or more driving signals to the second actuator to rotate the payload about the second axis of rotation.

2. The device as set forth in claim 1 further comprising:
a first sensor configured to measure a first angular displacement of the payload with respect to the first rotation axis; and
a second sensor configured to measure a second angular displacement of the payload with respect to the second rotation axis.

3. The device as set forth in claim 2, wherein the first sensor and the second sensor are linear position sensors configured to measure movement of the payload in the direction orthogonal to the plane.

4. The device as set forth in claim 2, wherein the first sensor is positioned substantially along a first line defined by the first drive point and the center of the pivot point and the second sensor is positioned substantially along a second line defined by the second drive point and the center of the pivot point.

5. The device as set forth in claim 2, wherein the first sensor and the second sensor are coupled to the control device, wherein the processor coupled to the memory is further configured to execute at least one additional programmed instruction received from another processor or stored in the memory comprising:
receiving a first angular displacement value from the first sensor;
generating and providing one or more driving signals to the first actuator to rotate the payload about the first rotation axis to a first target value for the first angular displacement based on the received first angular displacement value;
receiving a second angular displacement value from the second sensor;
generating and providing one or more driving signals to the second actuator to rotate the payload about the second rotation axis to a second target value for the second angular displacement based on the received second angular displacement value.

6. The device as set forth in claim 1, wherein at least one of the first actuator or the second actuator comprises a piezoelectric ultrasonic motor configured to generate movement of the payload by a friction force generated at the first drive point or the second drive point.

7. The device as set forth in claim 1, wherein the first rotation axis and the second rotation axis are substantially orthogonal.

8. The device as set forth in claim 1, wherein the payload is a camera, a mirror, or an optical device.

9. The device as set forth in claim 1 further comprising:
a first preload device configured to deflect the first actuator toward the payload to generate a first normal force at the first drive point; and a second preload device configured to deflect the second actuator toward the payload to generate a second normal force at the second drive point.

10. A method for making a two-axis angular pointing device comprising:
    providing a pivot bearing configured to support a payload;
    positioning a first actuator contact the payload at a first drive point;
    positioning a second actuator to contact the payload at a second drive point, wherein the first actuator is configured to generate a first movement of the payload in a direction substantially orthogonal to a plane defined by a center of the pivot bearing, the first drive point, and the second drive point to cause the payload to rotate around a first rotation axis, and the second actuator is configured to generate a second movement of the payload at the second drive point in the direction substantially orthogonal to the plane to cause the payload to rotate around a second rotation axis;
    coupling a first drive circuit to the first actuator and a second drive circuit coupled to the second actuator;
    coupling a control device to the first drive circuit and the second drive circuit, the control device comprising a processor coupled to a memory and configured to execute programmed instructions received from another processor or stored in the memory comprising:
        generating and providing one or more driving signals to the first actuator to rotate the payload about the first axis of rotation; and
        generating and providing one or more driving signals to the second actuator to rotate the payload about the second axis of rotation.

11. The method as set forth in claim 10 further comprising:
    providing a first sensor configured to measure a first angular displacement of the payload with respect to the first rotation axis; and
    providing a second sensor configured to measure a second angular displacement of the payload with respect to the second rotation axis.

12. The method as set forth in claim 11, wherein the first sensor and the second sensor are linear position sensors configured to measure movement of the payload in the direction orthogonal to the plane.

13. The method as set forth in claim 11, wherein the first sensor is positioned substantially along a first line defined by the first drive point and the center of the pivot point and the second sensor is positioned substantially along a second line defined by the second drive point and the center of the pivot point.

14. The method as set forth in claim 11, further comprising:
    coupling the first sensor and the second sensor to the control device, wherein the processor coupled to the memory is further configured to execute at least one additional programmed instruction received from another processor or stored in the memory comprising:
    receiving a first angular displacement value from the first sensor;
    generating and providing one or more driving signals to the first actuator to rotate the payload about the first rotation axis to a first target value for the first angular displacement based on the received first angular displacement value;
    receiving a second angular displacement value from the second sensor;
    generating and providing one or more driving signals to the second actuator to rotate the payload about the second rotation axis to a second target value for the second angular displacement based on the received second angular displacement value.

15. The method as set forth in claim 10, wherein at least one of the first actuator or the second actuator comprises a piezoelectric ultrasonic motor configured to generate movement of the payload by a friction force generated at the first drive point or the second drive point.

16. The method as set forth in claim 10, wherein the first rotation axis and the second rotation axis are substantially orthogonal.

17. The method as set forth in claim 10, wherein the payload is a camera, a mirror, or an optical device.

18. The method as set forth in claim 10 further comprising:
    positioning a first preload device, the first preload device configured to deflect the first actuator toward the payload to generate a first normal force at the first drive point; and
    positioning a second preload device, the second preload device configured to deflect the second actuator toward the payload to generate a second normal force at the second drive point.

* * * * *